United States Patent [19]
Lampe

[11] Patent Number: 5,568,511
[45] Date of Patent: Oct. 22, 1996

[54] SYSTEM AND METHOD FOR RADIO DISCONNECT AND CHANNEL ACCESS FOR DIGITIZED SPEECH TRUNKED RADIO SYSTEMS

[75] Inventor: Ross W. Lampe, Raleigh, N.C.

[73] Assignee: Ericsson GE Mobile Communications Inc., Research Triangle Park, N.C.

[21] Appl. No.: 935,440

[22] Filed: Aug. 26, 1992

[51] Int. Cl.⁶ .................................................. H04B 3/36
[52] U.S. Cl. ........................ 375/211; 375/219; 375/222; 370/26; 370/31; 370/55; 370/95.3; 379/59; 379/63; 455/331; 455/34.1; 455/54.1
[58] Field of Search ................................. 375/7, 8, 211, 375/219, 222; 370/31, 32, 95.3, 95.1, 94.2, 26, 97, 55; 455/89, 54.1, 54.2, 33.1, 33.2, 34.1; 379/58–60, 63, 98

[56] References Cited

U.S. PATENT DOCUMENTS

| | | | |
|---|---|---|---|
| 3,898,390 | 8/1975 | Wells et al. | 325/55 |
| 4,672,601 | 6/1987 | Ablay | 370/31 |
| 4,905,302 | 2/1990 | Childress et al. | 455/34.1 |
| 4,932,071 | 6/1990 | Arndt et al. | 455/58 |
| 4,937,818 | 6/1990 | Sonetaka | 370/95.3 |
| 4,949,395 | 8/1990 | Rydbeck | 455/33 |
| 4,977,589 | 12/1990 | Johnson et al. | 379/58 |
| 5,003,582 | 3/1991 | Maddens | 379/98 |
| 5,086,507 | 2/1992 | Mela | 455/34 |
| 5,091,906 | 2/1992 | Reed et al. | 370/31 |
| 5,131,007 | 7/1992 | Brown et al. | 375/40 |
| 5,166,929 | 11/1992 | Lo | 370/95.3 |
| 5,239,545 | 8/1993 | Buchholz | 370/95.3 |
| 5,299,199 | 3/1994 | Wilson et al. | 370/95.3 |

FOREIGN PATENT DOCUMENTS

| | | |
|---|---|---|
| 0338834 | 10/1989 | European Pat. Off. . |
| 0462572A2 | 12/1991 | European Pat. Off. . |
| 2177574 | 1/1987 | United Kingdom . |

Primary Examiner—Stephen Chin
Assistant Examiner—Amanda T. Le
Attorney, Agent, or Firm—Nixon & Vanderhye P.C.

[57] ABSTRACT

In half-duplex, trunked digitized voice communications between mobile transceivers, the present invention minimizes time delays occurring after one transceiver ends a transmission and before other transceiver communications may commence. A disconnect signal is transmitted from the currently transmitting transceiver during a time frame immediately following indication that a current communication has ended. Channel access time delays are minimized by permitting speech input to a transmitting transceiver immediately upon receipt of a working communications channel. The present invention has particular applicability in trunked TDMA radio communication systems.

30 Claims, 4 Drawing Sheets

SYSTEM AND METHOD FOR RADIO DISCONNECT AND CHANNEL ACCESS FOR DIGITIZED SPEECH TRUNKED RADIO SYSTEMS

FIELD OF THE INVENTION

The present invention relates to trunked digitized voice transmission systems and more particularly to radio disconnect and channel access signalling in such systems. Particular application is found wherever digitized electrical signals of any type are to be transmitted in a constrained bandwidth having a limited number of signal transmission channels. The present application is particularly advantageous in trunked TDMA radio communications.

BACKGROUND AND SUMMARY OF THE INVENTION

Contemporary multichannel radio frequency (RF) communication systems typically employ one or more channels to pass signalling and control information to and between subscriber units. In frequency division multiple access (FDMA) systems, each communication channel occupies one particular frequency within an allocated bandwidth. Since bandwidth is constrained, there are only a limited number of frequency channels available for communication with sufficient frequency separation to avoid co-channel interference, e.g. one communications channel per 25 KHz. More efficient bandwidth use is achieved in Time Division Multiple Access (TDMA) systems in which each suitably separated frequency is divided into a number of distinct time slots, each time slot forming a separate channel for communication. Accordingly, several communications channels are formed on a single frequency using time division multiplex principles. Although somewhat more complicated, TDMA systems considerably increase capacity of the allocated bandwidth, e.g. three communications channels per 25 KHz, and for that reason are desirable.

The present invention contemplates a trunked, digitized speech (FDMA or TDMA) communications system with half-duplex digital radios operating to transmit or receive information (but not both) at any particular instant. Compared to prior art half-duplex trunked radios which send continuous analog speech signals over specific frequency channels, digitized speech systems incur additional time delays because of speech processing operations required. For example, unavoidable delays are caused by (1) speech coding frame and pipeline architectures; (2) signal processing, e.g. analog-to-digital conversion, encoding, encrypting, and transmitting speech and control signals; (3) signal routing through a repeater/site controller; and (4) signal decoding, decrypting, and digital-to-analog conversion at the receiving radio.

In TDMA systems, delays are further exacerbated since each channel transmission occurs in a specified time slot on a particular frequency. As a result, data and speech must be buffered and stored before transmission until the proper time slot occurs. Obviously, these delays can be a source of inconvenience and annoyance to users both at initiation and conclusion of conversations.

For example, annoying delays occur after users "disconnect" from a communications channel. When a first radio operator finishes speaking and releases his push-to-talk (PTT) button, a second listening radio operator reasonably expects that he can respond immediately. However, processing and buffering delays require the second operator wait a predetermined time period before his radio accepts speech inputs.

After the first operator releases his PTT button, a significant time period expires before a "disconnect signal" is transmitted via radio link to the trunked repeater/site controller system. That time period allows currently and recently accepted speech to be processed and transmitted. Soon after receiving the disconnect signal, a signal is transmitted from the controller system to all "second" operators in a group listening on that particular channel to drop the current working channel, switch to a control channel, and await assignment of a new working channel. A new working channel is assigned to a second user who desires to speak only after that time period has expired. Clearly, it is desirable to have a signalling strategy for minimizing the effect of the unavoidable time delays associated with channel disconnect in FDMA and TDMA trunked systems.

Similar delay problems affect system access. For example, when a user wants to communicate over the trunked system, he depresses the radio PTT button to transmit a request for a working channel over the assigned control channel. The repeater/site controller system responds with a "channel access signal" which assigns a working frequency within the allocated bandwidth (accompanied by a specific time slot in TDMA systems). The user's radio then emits an alert tone indicating that conversation may be commenced.

A significant time delay exists between receipt of a channel access signal and generation of an alert tone signalling that the radio will now accept speech input. That delay is caused by necessary radio "set up" procedures, e.g., switching radio frequency synthesizers from the control frequency channel to the working frequency channel, synchronizing the allocated time slot channel (in TDMA systems), loading significant system and feature related software into its signal processor, adjusting the RF power, etc. Accordingly, it would be desirable to develop a signalling and processing system which minimizes delays in disconnect from and access to a radio channel in a digitized radio communication system.

The present invention advantageously resolves the above-described problems in half-duplex, trunked digital communications between mobile transceivers by providing a means for minimizing time delays occurring after one transceiver ends a transmission and before another transceiver communication may commence. Such minimizing means may include means for transmitting a disconnect signal from the currently transmitting transceiver during a time frame immediately following indication of an end to a communication and/or means for permitting speech input to a transmitting transceiver immediately upon receipt of a communications channel.

The system of the present invention has particular applicability to time division multiple access (TDMA) communications systems where each time frame is divided into plural time slots. For channel disconnect, the disconnect signal is transmitted during a first time slot in a time frame immediately after detecting a change in the status of a transmission switch on the transceiver. For channel access, an alert tone is generated immediately during a time slot when a communications channel has been assigned. However, speech captured in subsequent time slots in that time frame is not transmitted.

The present invention further includes a method for minimizing channel disconnect delays in a half-duplex radio system including plural mobile transceivers for processing speech in consecutive time frames. Included are steps of (a) detecting completion of a transceiver transmission in a first time frame; (b) transmitting a disconnect signal during a second immediately following time frame; and (c) prohibiting transmission of speech captured in the first time frame unless there is sufficient processing time before the second immediately following time frame. Before step (a), the present invention may include the additional steps of capturing speech in consecutive time frames, and processing and storing speech in time frames immediately following the time frame of capture. Time frames may be divided into a series of time slots with each time slot providing a separate communications channel. Accordingly, the disconnect signal is transmitted in step (b) during the speaker's first available assigned time slot in the second time frame.

After step (a) and during the first time frame, the present invention includes the steps of processing and storing the speech captured in the immediately preceding time frame, and transmitting the processed and stored speech during the second time frame. The disconnect signal is transmitted along with the processed and stored speech from the preceding time frame over a working communications channel.

The present invention also includes a method for minimizing channel access delays in the half-duplex radio system including plural mobile transceivers for processing speech in consecutive time frames including the steps of (a) receiving a working channel via a control channel during the first time frame; (b) immediately thereafter generating an alert signal to a transceiver user and permitting receipt of speech input from the user; and (c) processing and transmitting speech received in consecutive time frames.

Before step (a) the present invention may additionally include the steps of depressing a transceiver transmit switch and generating a channel access request over the control channel. Simultaneous with alert signal generation, the method of the present invention includes performing speech processing and transmission functions, and thereafter, performing functions relating to tasks other than speech processing and transmission.

These as well as other advantages, objects and features of the invention will be better appreciated by a careful study of the following detailed description of the presently preferred exemplary embodiment of this invention in conjunction with the accompanying drawings, of which:

DETAILED DESCRIPTION OF THE EXEMPLARY PREFERRED EMBODIMENT

In the following description, for purposes of explanation and not limitation, specific details are set forth, such as particular circuits, circuit components, interfaces, techniques, etc. in order to provide a thorough understanding of the present invention. However, it will be apparent to one skilled in the art that the present invention may be practiced in other embodiments that depart from these specific details. In other instances, detailed descriptions of well-known methods, devices and circuits are omitted so as not to obscure the description of the present invention with unnecessary detail.

Figure 1:
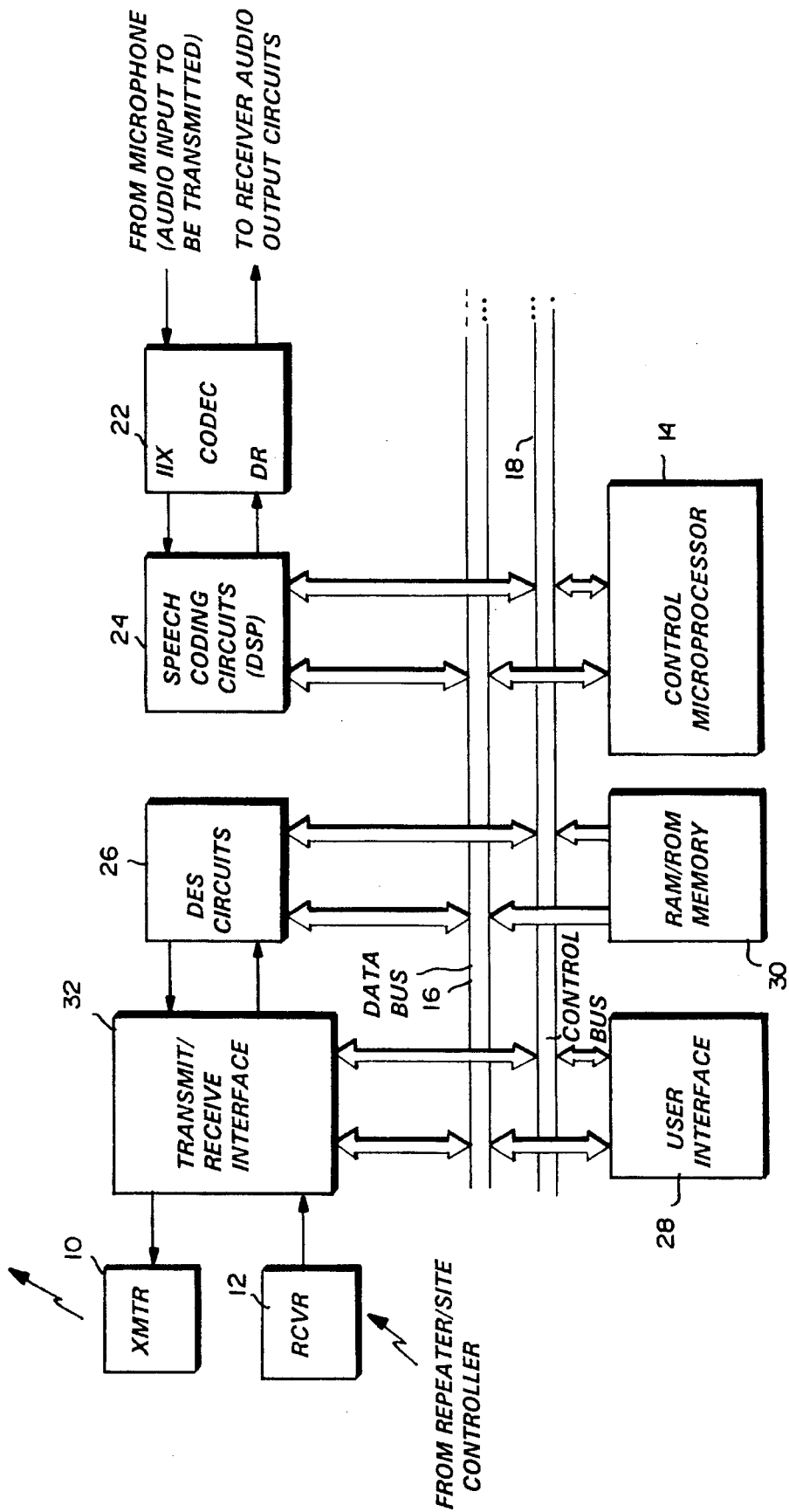
FIG. 1 is a schematic block diagram of the overall hardware architecture of a mobile transceiver in a trunked radio system which may be utilized to implement the present invention.

A trunked radio system according to the present invention includes plural mobile transceivers one of which is shown in FIG. 1. Each transceiver includes a radio frequency transmitter 10 and radio frequency receiver 12. The transceiver in a trunked system communicates with other transceivers, for example, via a repeater/site controller system (not shown) over a radio frequency communication channel.

The overall architecture of the transceiver control circuitry shown in FIG. 1 is generally conventional. The heart of the system is a control microprocessor 14. Communication with the remainder of the digital circuitry is by way of a standard data bus 16 and control bus 18. A push-to-talk switch (PTT) as well as numerous other input buttons, indicators, and displays are provided in user interface 28. The system includes a conventional coder-decoder circuit CODEC 22, e.g. an Intel 2916 integrated circuit chip, and conventional speech coding circuits 24 in the form of a suitably programmed digital signal processor (DSP), e.g. a TI TMS32065X integrated circuit chip, for converting audio signals to/from digital form and encoding/decoding speech in accordance with known speech digitization and processing algorithms, respectively.

Those skilled in the art will understand that modern DSP circuits such as speech coding circuits 24 may be appropriately microprogrammed so as to implement desired filtering and time delay functions as well as encoding/decoding algorithms, multiplexing and demultiplexing functions, etc.

Data encryption and decryption are implemented via conventional DES circuits 26 and memory, e.g. RAM or within the DSP circuit 24. Data encryption/decryption is purely optional and is not required for implementation of the present invention.

A transmit/receive interface 32 on the transmit side may include a conventional parallel-to-serial shift register for generating a serial stream of binary signals to be transmitted. On the receive side, the transmit/receive interface 32 may typically utilize a digital, phase locked loop for achieving binary bit synchronization in a hardwired correlator for recognizing predetermined synchronization codes, e.g. Barker Codes. In digitized speech transmissions, transmitter-receiver synchronization is required between time frames (FDMA and TDMA) and time slots (TDMA only). Accordingly, transmit/receive interface 32 serves an important buffering function for storing processed speech until the appropriate transmit time occurs.

Although not shown, mobile transceivers as illustrated in FIG. 1 communicate via one or more repeaters which are controlled by a conventional site controller. The repeater/site controller system monitors and controls information on a control channel and allocates/switches working communication channels to achieve the most effective use of the prescribed bandwidth using conventional trunking techniques.

In operation, audio input information from a microphone is received in CODEC 22 and converted from its analog form into digitized speech. A serial output stream of digitized speech is received by speech coding circuit 24 which encodes the speech in accordance with well known encoding algorithms. Transfer of the encoded/digitized speech to the DES encryption circuits 26 (if an encryption is desired) and to transmit/receive interface 32 is performed under the control of microprocessor 14 via the data and control buses. Information buffered in transmit/receive interface 32 is then forwarded to transmitter 10 for conventional transmission on an assigned working communications channel.

Receiver 12 receives radio frequency input information transmitted over frequency channels to which receiver 12 is tuned. The demodulated information is received by transmit/receive interface 32 from receiver 12 and decrypted in DES circuits 26 (if the information is encrypted) and otherwise placed on data bus 16. Control microprocessor 14 transfers the information to speech decoding circuits 24 and CODEC 22 to decode the information from digitized speech into analog format for transmission to audio output circuits, e.g. audio amplifiers, loudspeakers, etc.

Figure 2:
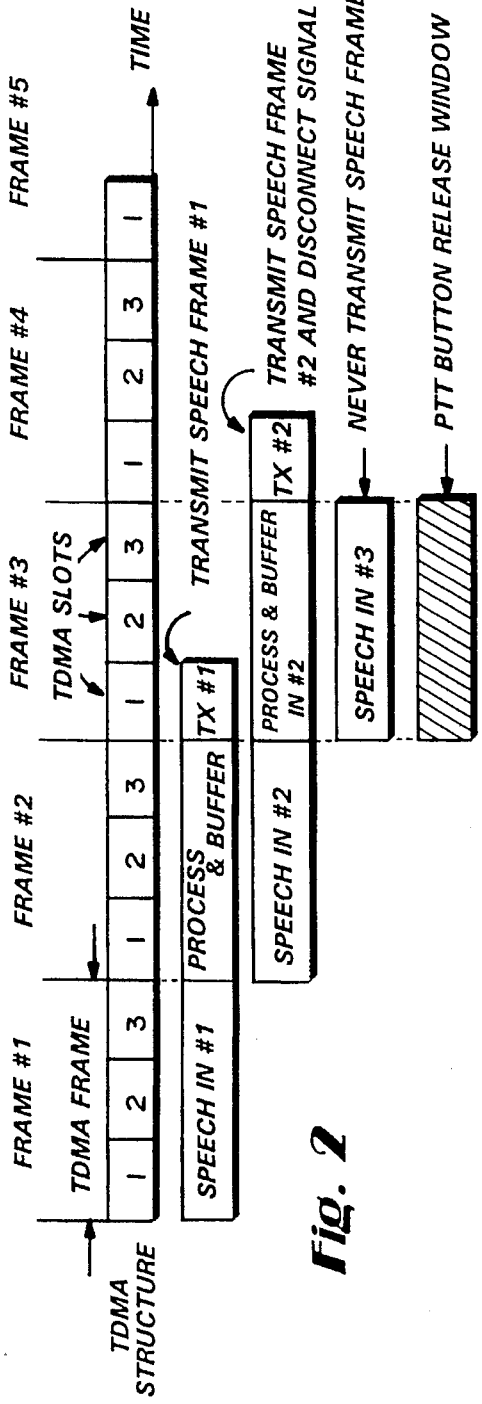
FIG. 2 is a frame diagram illustrating channel disconnect procedure according to the present invention in the context of a TDMA system.

The operation of mobile transceivers according to present invention will be described in conjunction with FIG. 2 which relates to minimizing channel disconnect delay times. Although FIG. 2 is an example of a TDMA frame structure, those skilled in the art will appreciate that a similar frame analysis could be applied to FDMA digitized speech frames as well. Moreover, while the preferred embodiment of the invention is disclosed in terms of a trunked TDMA system, it will be recognized by those of ordinary skill in the art that the present invention could be readily applied to other communication systems as well, e.g. trunked FDMA systems.

For purposes of describing the present invention, the term speech time frame is a period of time for capturing a predetermined amount of speech, e.g. twenty milliseconds of speech, as well as with other associated control information. In each TDMA speech frame there are a number of time slots, e.g. three, each time slot representing an individual communications channel. During a particular speech frame, for example frame 1, speech received during frame 1 is processed and buffered in the next frame 2. Significant processing operations are required to prepare speech captured in each frame for transmission, including, for example, encoding and encrypting the speech, switching the transmitter frequency synthesizer to a particular working channel, loading the relevant feature software into the control microprocessor 14, etc., as well as buffering the finally processed speech from a particular frame until the next assigned time slot occurs when the captured speech is transmitted.

In the case of speech captured in frame 1, the actual transmission of that speech does not occur until the assigned time slot in speech frame number 3, shown as time slot 1 in TDMA frame number 3 in FIG. 2. Thus, speech received in frame 1, processed and buffered in frame 2, is finally transmitted in frame 3 during time slot 1. Similarly, speech captured in time frame 2 is then processed and buffered in frame 3 and transmitted in its assigned time slot in frame 4 in "pipeline" fashion.

Also illustrated in FIG. 2 is a PTT button release window which generally conforms to the speech frame during which the PTT button is released. In FIG. 2, the PTT button is released during speech frame 3. It may be necessary to incorporate a tolerance of plus or minus ten or more percent of a time slot period at the beginning and end of the PTT release window to account for processing time related to recognizing release of the PTT button and formatting a disconnect signal into the transmission data sequence. For purposes of illustration, the PTT release window in FIG. 2 is shown without a tolerance and therefore it begins with time slot 1 in speech frame 3 and ends just before time slot 1 in frame 4.

After detecting release of the PTT button in frame 3, speech received in frame 2 and processed and buffered in frame 3 is transmitted along with the disconnect signal in time slot 1 in frame 4. Thus, the disconnect signal is transmitted immediately after PTT button release. No delays are incurred waiting for processing and transmission of speech in the "pipeline."

Speech that cannot be processed before the transmit time slot containing the disconnect signal, i.e. the speech captured in frame 3, is not processed or transmitted. However, this lost speech is sufficiently insignificant so that it is generally not noticed by radio users. Thus, the present invention significantly decreases time delays before the disconnect signal is transmitted without noticeably degrading the communication content. In terms of the example shown in FIG. 2, immediately after the PTT button is released, the disconnect signal is transmitted rather than waiting for the processing of speech received in frame 3.

Figure 4:
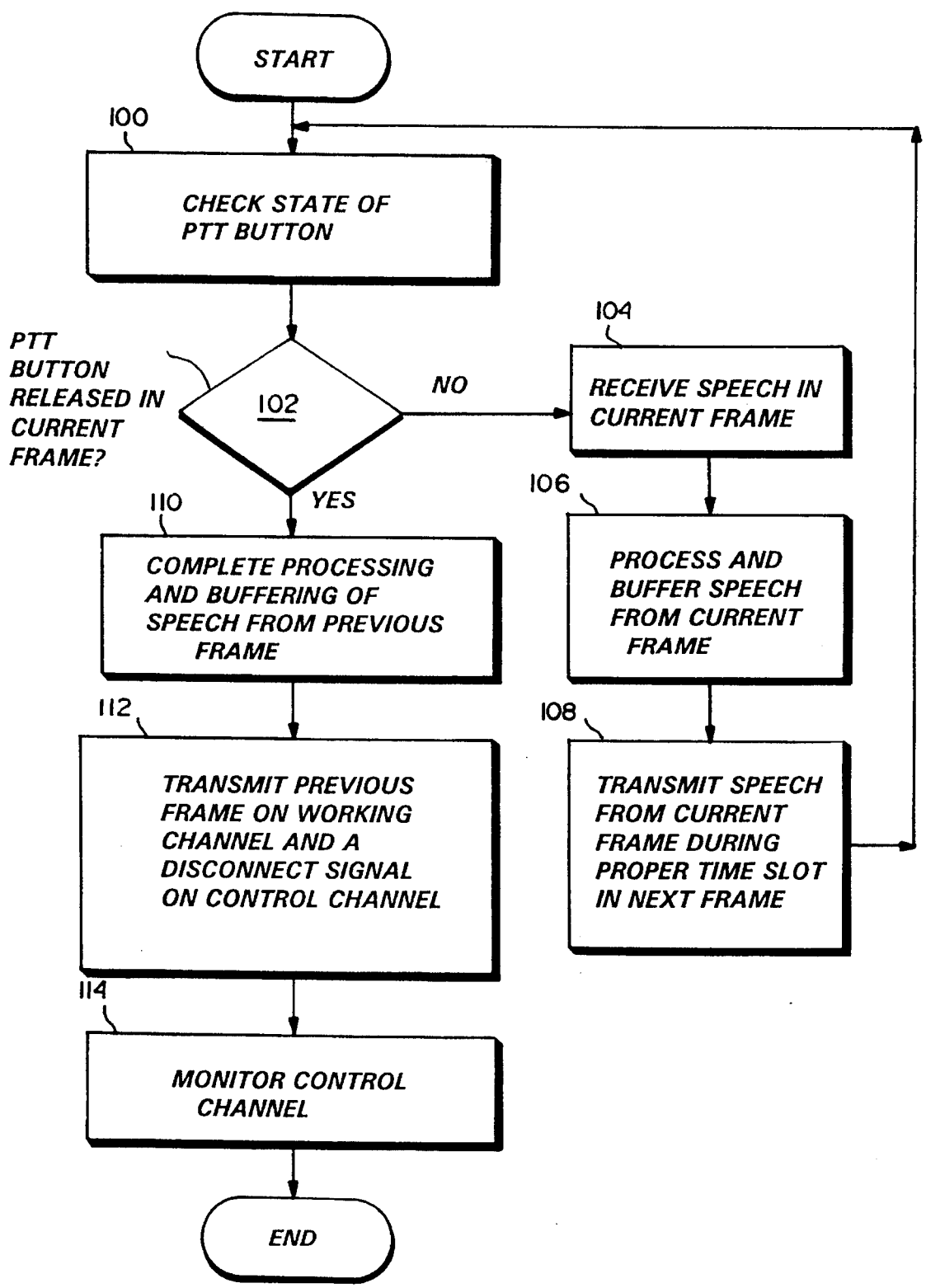
FIG. 4 is a schematic flow chart diagram of exemplary program steps relating to channel disconnect procedures according to the present invention.

FIG. 4 is a schematic type flow chart diagram of exemplary program steps performed by microprocessor 14 in the mobile transceiver in accordance with the presently preferred exemplary embodiment of the invention. Assume that a mobile transceiver is currently transmitting voice information over a preassigned working channel. The microprocessor 14 checks the state of the PTT button (block 100) and determines whether the PTT button is released (block 102). If the PTT button is depressed, speech in the current frame is received (block 104) and processed and buffered in transmit/receive interface 32 (block 106). In the next frame, the processed and buffered speech is transmitted during its assigned time slot (block 108), and microprocessor 14 again checks the status of the PTT button (block 100).

If the PTT button is released during the current frame, the processing and buffering of speech from the previous frame is completed (block 110). During the next frame, that buffered speech is transmitted on its assigned working channel, i.e. during its proper time slot, and a disconnect signal is transmitted at the same time (block 112). Disconnect is effected, and the mobile transceiver simply monitors the control channel to await a signal from the repeater/site controller system designating the working channel to which it should tune to receive further communications (block 114).

When a user wants to respond or to otherwise access the trunked system, he presses the PTT button to transmit a request for a working channel over the control channel. Typically, the repeater/site controller system responds with appropriate channel access signalling to assign an available frequency channel and TDMA time slot to provide a working communications channel. Despite the assignment of a working channel at this point, the user cannot transmit speech until several events occur. First, an alert tone must be generated to inform the user to begin speaking. Second, the mobile radio must begin accepting speech inputs. Third, a wide range of processing or "setup tasks" described previously must be performed, e.g. switching synthesizers to the working channel frequency, time slot synchronization, etc. The present invention minimizes delays occurring between the time the mobile radio receives channel access signalling from the repeater/site controller and the time when it begins transmitting speech over its working channel.

Figure 3:
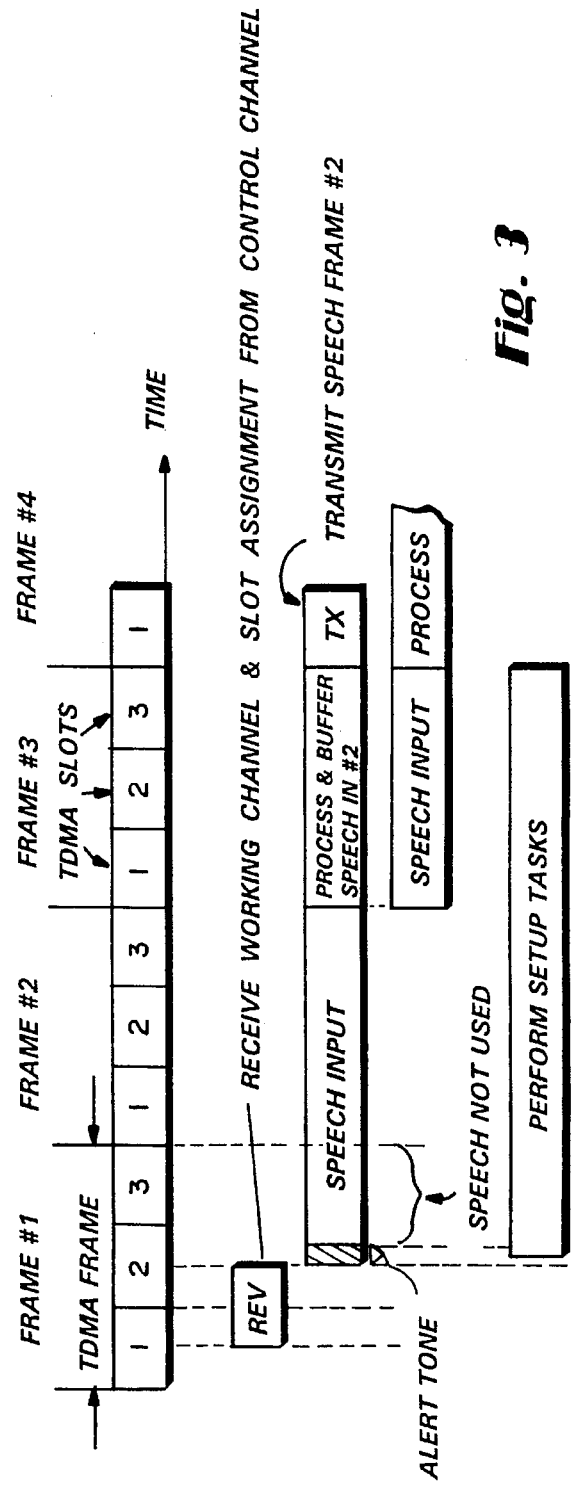
FIG. 3 is a frame diagram illustrating a channel access procedure according to the present invention in the context of a TDMA system.

FIG. 3 is an example of a TDMA frame structure showing channel access features of the present invention. Assumed in FIG. 3 is that the transceiver operator has depressed the PTT button to request access to the system. During a time bridging time slots 1 and 2 in frame 1 shortly after depression of the PTT button, an accessing mobile transceiver receives over the control channel a working frequency and time slot assignment. Immediately thereafter, an alert tone is generated to signal to the transceiver operator that he may begin speaking immediately. Thus, the mobile transceiver permits speech input beginning immediately in time slot 2 of frame 1.

At substantially the same time the alert tone is generated, microprocessor 14 commences setup tasks required for transmitting speech over the assigned working channel described above. Because some setup tasks are not related to preparing speech input for transmission, e.g. loading software into the DSP chip, switching the synthesizers to the working channel frequency, etc., the initially performed setup tasks directly relate to preparing speech input for transmission, e.g. speech digitizing, encoding, encrypting, etc. Tasks not directly related to speech preparation are performed later in time.

Speech input captured in frame 2 is processed and buffered in frame 3 and then transmitted during time slot 1 of frame 4. Speech captured in frame 1 after alert tone generation up to frame 2 is not used. This time period is brief, and an operator may not have even begun speaking. Moreover, any speech input that is lost typically does not affect understanding of the communication.

Figure 5:
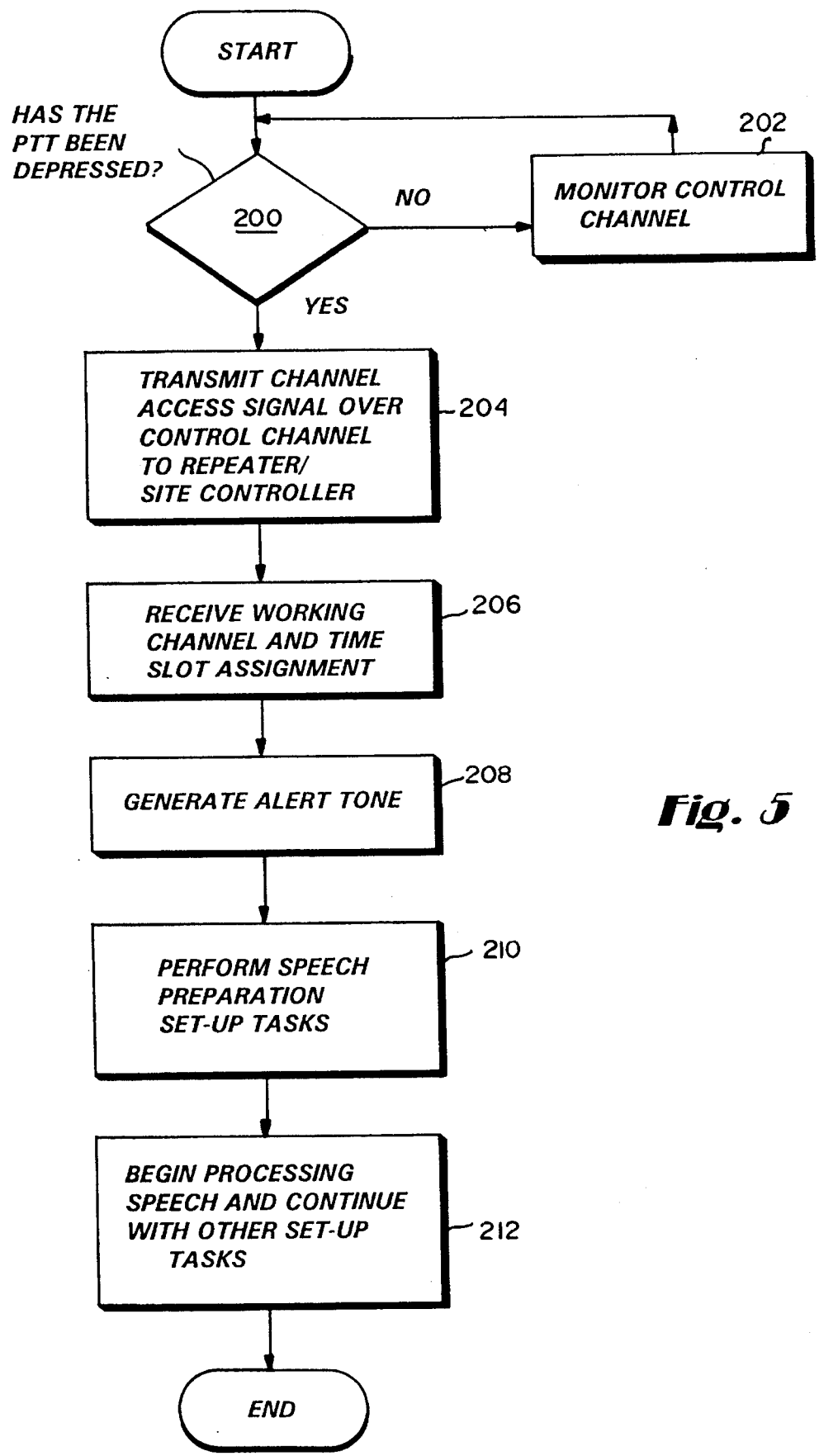
FIG. 5 is a schematic flow chart diagram of exemplary program steps relating to channel access procedures according to the present invention.

A schematic-type flow chart diagram of exemplary program steps performed by microprocessor 14 is provided in FIG. 5. Microprocessor 14 initially detects whether the PTT button has been depressed (block 200). If not, microprocessor 14 continues to monitor the control channel (block 202). If the PTT button is depressed, microprocessor 14 causes a channel access signal to be transmitted over the control channel to the repeater/site controller (block 204). Once working channel and time slot assignments are received (block 206), microprocessor 14 causes an alert tone to be generated (block 208) to indicate to an operator to begin speaking into the radio transceiver. At substantially the same time, microprocessor 14 commences setup tasks which specifically relate to speech preparation (block 210). Microprocessor 14 then processes and buffers speech as well as performs other setup tasks (block 212) followed by subsequent transmission of the processed speech in the next time frame.

It is to be understood by those of ordinary skill in the art that the present invention has been described in exemplary terms and is not limited to the TDMA frame structure shown. Nor is it limited by data interleaving between time slots. While the present invention is particularly advantageous in minimizing delays in trunked TDMA systems, the present invention may be applied to trunked FDMA systems in substantially the same manner.

Thus, the present invention neutralizes the effects of unavoidable delays associated with digitized voice radio communications. By prioritizing specific events and control signalling, channel disconnect and channel access delays are minimized. Processing and communication resources more efficiently utilized, and operator inconvenience is reduced.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A digital communications system including a plurality of portable/mobile transceivers, where a controller assigns an available one of a plurality of working communications channels to a transceiver requesting a working channel over a control channel, each transceiver comprising:

an encoder for digitally encoding speech signals input to one of said transceivers;

a transmitter for transmitting digitally encoded speech signals;

a receiver for receiving digitized speech signals;

a decoder for decoding the received speech signals; a data processor connected to the encoder, transmitter, decoder, and receiver for minimizing time delays occurring between a time when an operator of the transceiver ends a transmission over a current working channel and a time when the current working channel is disconnected.

2. The system according to claim 1, wherein said:

transmitter transmits a disconnect signal over the current working channel from the transceiver during a time frame immediately following an indication by the operator that a present communication has ended.

3. The system according to claim 2, further comprising:

a switch actuable by the operator for indicating an end to said present communication.

4. The system according to claim 1, wherein said:

data processor permits speech input to a transceiver immediately upon receipt of a communications channel.

5. The system according to claim 1, further comprising:

means for initiating an access to a communications channel;

means for generating an alert signal immediately upon receiving a communications channel assignment; and means for permitting transceiver speech input and for simultaneously performing channel set up tasks relating to speech transmission.

6. The system according to claim 1, wherein said system is a half-duplex, transmission-trunked, digital communications system.

7. A system according to claim 1, wherein the working channel is disconnected before all of the digitally encoded speech signals are transmitted.

8. A digital communications system including a plurality of mobile transceivers, where a controller assigns an available one of a plurality of working communications channels to a transceiver requesting a working channel over a control channel, each transceiver comprising:

means for digitally encoding and transmitting speech signals input to one of said transceivers;

means for receiving and decoding transmitted digitized speech signals;

means, connected to the means for digitally encoding and transmitting and to the means for receiving and decoding, for minimizing time delays occurring between a time when an operator of the transceiver ends a transmission over a current working channel and a time when the current working channel is disconnected, said means for encoding and transmitting capturing speech in consecutive speech frames; and means for processing and buffering speech captured in a current speech frame during the next speech frame such that said means for encoding and transmitting transmits the processed and buffered speech during a speech frame following said next speech frame.

9. A digital communications system including a plurality of mobile transceivers, where a controller assigns an available one of a plurality of working communications channels to a transceiver requesting a working channel over a control channel, each transceiver comprising:

means for digitally encoding and transmitting speech signals input to one of said transceivers;

means for receiving and decoding transmitted digitized speech signals; and means, connected to the means for digitally encoding and transmitting and to the means for receiving and decoding, for minimizing time delays occurring between a time when an operator of the transceiver ends a transmission over a current working channel and a time when the current working channel is disconnected, wherein said means for minimizing includes:

means for detecting the status of a transmission switch of said one transceiver;

means for transmitting a disconnect signal from said one transceiver during a disconnect time frame after detecting change in the status of said transmission switch; and means for preventing processing and transmission of speech information received during said disconnect time frame.

10. A half-duplex trunked digital communications system for providing communications between a plurality of mobile transceivers, each transceiver comprising:

means for digitally encoding and transmitting speech signals input to one of said transceivers;

means for receiving and decoding transmitted digitized speech signals; and means, connected to the means for digitally encoding and transmitting and to the means for receiving and decoding, for minimizing time delays occurring after one transceiver ends a transmission and before another transceiver communication may commence including;

means for detecting the status of a transmission switch of said one transceiver;

means for transmitting a disconnect signal from said one transceiver during a disconnect time frame after detecting change in the status of said transmission switch; and means for preventing processing and transmission of speech information received during said disconnect time frame;

wherein said system is a time division multiple access (TDMA) communications system, each speech frame being divided into plural time slots such that said disconnect signal is transmitted during a first time slot in said disconnect time frame.

11. A digital communications system including a plurality of mobile transceivers, where a controller assigns an available one of a plurality of working communications channels to a transceiver requesting a working channel over a control channel, each transceiver comprising:

means for digitally encoding and transmitting speech signals input to one of said transceivers;

means for receiving and decoding transmitted digitized speech signals; and means, connected to the means for digitally encoding and transmitting and to the means for receiving and decoding, for minimizing time delays occurring between a time when an operator of the transceiver ends a transmission over a current working channel and a time when the current working channel is disconnected;

means for initiating an access to a communications channel;

means for generating an alert signal immediately upon receiving a communication channel assignment;

means for permitting transceiver speech input and for simultaneously performing channel set up tasks relating to speech transmission; and means for processing and buffering speech received during a speech frame following receipt of said communications channel assignment.

12. A digital communications system including a plurality of mobile transceivers, where a controller assigns an available one of a plurality of working communications channels to a transceiver requesting a working channel over a control channel, each transceiver comprising:

means for digitally encoding and transmitting speech signals input to one of said transceivers;

means for receiving and decoding transmitted digitized speech signals; and means, connected to the means for digitally encoding and transmitting and to the means for receiving and decoding, for minimizing time delays occurring between a time when an operator of the transceiver ends a transmission over a current working channel and a time when the current working channel is disconnected;

means for initiating an access to a communications channel;

means for generating an alert signal immediately upon receiving a communication channel assignment; and means for permitting transceiver speech input and for simultaneously performing channel set up tasks relating to speech transmission, wherein said communications system is a time division multiple access system where speech is captured in consecutive speech frames and transceived during assigned time slots in speech frames subsequent to capture.

13. The system according to claim 12, wherein said means for generating generates said alert signal during a time slot when said communications channel assignment is completed such that speech captured in time slots in a speech frame during which the alert tone is generated is not transmitted.

14. A method for minimizing channel disconnect delays in a radio system including plural mobile transceivers for processing speech over an assigned one of a plurality of working channels captured in consecutive time frames, comprising the steps of:

(a) detecting completion of a transceiver transmission over the assigned working channel in a first time frame;

(b) transmitting a disconnect signal over the assigned working channel during a second following time frame; and (c) prohibiting transmission of speech over the assigned working channel captured in said first time frame.

15. The method according to claim 14, further comprising before step (a):

capturing speech in consecutive time frames, and processing and storing speech in time frames immediately following the time frame of capture.

16. The method according to claim 15, further comprising after step (a):

during said first time frame, completing processing and storing of speech captured in the time period immediately preceding said first time frame, and transmitting the processed and stored speech from said preceding time frame during said second time frame.

17. The method according to claim 16, wherein said disconnect signal and the processed and stored speech from said preceding time frame is transmitted over a working communications channel.

18. The method according to claim 14, wherein step (a) includes detecting the release of a mobile transceiver push-to-talk switch.

19. The method according to claim 14, wherein said system is a half-duplex, transmission-trunked, digital communications system.

20. A method for minimizing channel disconnect delays in a half-duplex radio system including plural mobile transceivers for processing speech in consecutive time frames, comprising:

(a) capturing speech in consecutive time frames;

(b) processing and storing speech in time frames immediately following the time frame of capture;

(c) detecting completion of a transceiver transmission in a first time frame, (d) transmitting a disconnect signal during a second following time frame, wherein time frames are divided into a series of time slots, each time slot providing a separate communications channel, and said disconnect signal is transmitted in said step (d) during a first available assigned time slot in said second time frame.

21. A method for minimizing channel access delays in a radio system where each of plural mobile transceivers performs the steps comprising:

(a) receiving a working channel assignment via a control channel during a first time frame on the assigned working channel;

(b) generating an alert signal to a transceiver user and permitting receipt of speech input from said user; and (c) processing and transmitting speech received in consecutive time frames such that speech received during said first time frame is not transmitted over the assigned working channel unless there is time remaining in said first time frame to process speech received during said first time frame before a second, following time frame begins.

22. The method according to claim 21, further comprising before step (a) the steps of depressing a transceiver transmit switch, and generating a channel access request over said control channel.

23. The method according to claim 21, wherein said radio system is a time division multiple access system such that said working channel defines an particular frequency and one of plural time slots in a time frame.

24. The method according to claim 21, wherein said system is a half-duplex, transmission-trunked, digital communications system.

25. A method for minimizing channel access delays in a half-duplex radio system including plural mobile transceivers for processing speech in consecutive time frames, comprising:

receiving a working channel assignment via a control channel during a first time frame;

generating an alert signal to a transceiver user and permitting receipt of speech input from said user; and processing and transmitting speech received in consecutive time frames such that speech received during said first time frame is not transmitted unless there is sufficient time to process speech received during the first time frame before a second following time frame begins;

wherein simultaneous with the alert signal generating step, said method further comprises the steps of:

initially performing transceiver speech processing functions, and thereafter performing functions relating to tasks other than speech processing.

26. A method for minimizing channel access delays in a half-duplex radio system including plural mobile transceivers for processing speech in consecutive time frames, comprising:

(a) receiving a working channel assignment via a control channel during a first time frame;

(b) generating an alert signal to a transceiver user and permitting receipt of speech input from said user; and (c) processing and transmitting speech received in consecutive time frames whereby speech received during said first time frame is not transmitted unless there is sufficient processing time before a second following time frame;

further comprising the steps of:

(d) capturing speech received in a second time frame following said first frame;

(e) processing and buffering second time frame speech in a third consecutive time frame;

(f) transmitting speech processed and buffered in said third time frame in a fourth consecutive time frame.

27. In a radio communications system, a method of controlling digital communications between radios where a controller assigns an available one of plural working radio channels to a radio requesting a working channel over a control channel, with the radio performing the steps of:

(a) receiving information to be transmitted;

(b) transmitting the received information over an assigned working channel;

(c) detecting when an operator indicates completion of a communication; and (d) transmitting a disconnect signal before all of the received information is transmitted.

28. The method according to claim 27, further comprising after step (a) the step of storing the received information, wherein some of the stored information is not transmitted in step (d).

29. The method according to claim 27, further comprising after step (a) the steps of:

dividing received information into frames, and processing the framed information, wherein one frame of information is not transmitted in step (d).

30. The method according to claim 29, wherein the one frame is also not processed.

* * * * *